US006591374B1

United States Patent
Christensen et al.

(10) Patent No.: US 6,591,374 B1
(45) Date of Patent: Jul. 8, 2003

(54) METHOD AND APPARATUS FOR FORCING SYSTEM COMPONENTS TO TEMPORARILY ENTER A STANDBY MODE OF OPERATION DURING SWITCHING EVENTS

(75) Inventors: Dirk R. Christensen, San Jose, CA (US); Matthew Castrigno, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1453 days.

(21) Appl. No.: 08/577,897

(22) Filed: Dec. 22, 1995

(51) Int. Cl.$^7$ .................................................. G06F 1/13
(52) U.S. Cl. ........................ 714/14; 714/24; 710/302; 713/324
(58) Field of Search ................................ 395/750, 182.2, 395/182.02, 182.08, 182.07, 182.09, 182.11, 182.12, 182.22, 281, 282, 283, 651; 370/217, 360, 95.2; 340/825.03, 826, 827; 379/268, 271–272

(56) References Cited

U.S. PATENT DOCUMENTS

| | | | | |
|---|---|---|---|---|
| 4,835,737 A | * | 5/1989 | Herrig et al. ................ 395/311 |
| 4,967,347 A | * | 10/1990 | Smith et al. ............ 395/182.08 |
| 5,005,172 A | * | 4/1991 | Kawamoto ............. 395/182.02 |
| 5,202,980 A | * | 4/1993 | Morita et al. .......... 395/182.08 |
| 5,253,184 A | * | 10/1993 | Kleinschnitz .......... 395/182.06 |
| 5,301,308 A | * | 4/1994 | Daar et al. .................. 395/575 |
| 5,367,668 A | * | 11/1994 | Pandolfo ..................... 395/575 |
| 5,526,493 A | * | 6/1996 | Shu .............................. 395/281 |
| 5,544,330 A | * | 8/1996 | Bither et al. ................ 395/280 |
| 5,561,759 A | * | 10/1996 | Chen ........................ 395/182.2 |
| 5,579,491 A | * | 11/1996 | Jeffries et al. .............. 395/283 |
| 5,581,692 A | * | 12/1996 | Nevitt et al. ............. 395/182.2 |
| 5,584,030 A | * | 12/1996 | Husak et al. ................ 395/750 |
| 5,586,271 A | * | 12/1996 | Parrett ......................... 395/283 |
| 5,596,569 A | * | 1/1997 | Madonna et al. ........... 370/217 |
| 5,625,238 A | * | 4/1997 | Ady et al. ................... 307/147 |
| 5,632,020 A | * | 5/1997 | Gephardt et al. ........... 395/283 |
| 5,675,724 A | * | 10/1997 | Beal et al. ............. 395/182.02 |
| 5,740,378 A | * | 4/1998 | Rehl et al. .................. 395/283 |
| 5,765,034 A | * | 6/1998 | Recio ......................... 395/287 |

* cited by examiner

*Primary Examiner*—Paul R. Myers
*Assistant Examiner*—Raymond N Phan
(74) *Attorney, Agent, or Firm*—Blakely, Sokoloff, Taylor & Zafman LLP

(57) ABSTRACT

In a data processing system that includes redundant elements, a method for protecting system components from transients that arise on a system interconnect during switching events. The system components operate in a normal mode of operation prior to detection of the impending occurrence of a switching event wherein a first redundant element replaces a failed element. Upon detecting the impending occurrence of a switching event, an indication that the switching event is to occur is conveyed to the system components. The system components respond by entering a standby mode of operation wherein system components isolate their circuitry from the system interconnect during the switching event. The system components returning to the normal mode of operation in response to a triggering event.

14 Claims, 7 Drawing Sheets

METHOD AND APPARATUS FOR FORCING SYSTEM COMPONENTS TO TEMPORARILY ENTER A STANDBY MODE OF OPERATION DURING SWITCHING EVENTS

FIELD OF THE INVENTION

The present application relates generally to data processing systems and more particularly to data processing systems that include redundant elements.

BACKGROUND

Data processing systems are often provided with "redundant" elements such as bus lines or system components in order to better ensure continued operation of a data processing system should an element of the data processing system fail. A redundant element may be "switched in" to replace the failed element such that the data processing system continues to function as normal.

"Switching events," wherein redundant elements are switched in to replace failed elements, typically produce voltage transients on the system interconnect of the data processing system. Such transients can damage system components or incorrectly alter the logical state of system components, and data processing systems that include redundant elements typically include a mechanism for reducing the effects of transients. Prior mechanisms have typically concentrated on minimizing the energy or voltage of the transients by using filters that attenuate the transients as they occur. Unfortunately, transients that have been attenuated can nonetheless alter the logical state of system components, which is undesirable.

SUMMARY AND OBJECTS OF THE INVENTION

Therefore, it is an object of the present invention to provide a mechanism that allows system components to ignore transients that occur during switching events.

This and other objects of the invention are provided by a method for protecting system components from transients that arise on a system interconnect during switching events. The system components operate in a normal mode of operation prior to detection of the impending occurrence of a switching event wherein a first redundant element replaces a failed element. Upon detecting the impending occurrence of a switching event, an indication that the switching event is to occur is conveyed to the system components. The system components respond by entering a standby mode of operation wherein system components isolate their circuitry from the system interconnect during the switching event. The system components returning to the normal mode of operation in response to a triggering event.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A data processing system that includes redundant elements uses a method whereby the impending occurrence of a switching event is detected and communicated to system components that thereafter isolate themselves from the system interconnect until after the switching event has occurred and any resulting transients have had an opportunity to settle. Because the system components are isolated from the system interconnect, the logical state of the system components cannot be altered by transients that arise on the system interconnect during the switching event. As will be described, there are number of possible methods and mechanisms for communicating the occurrence of switching events and for triggering the resumption of normal operation after a switching event has occurred.

Figure 1:
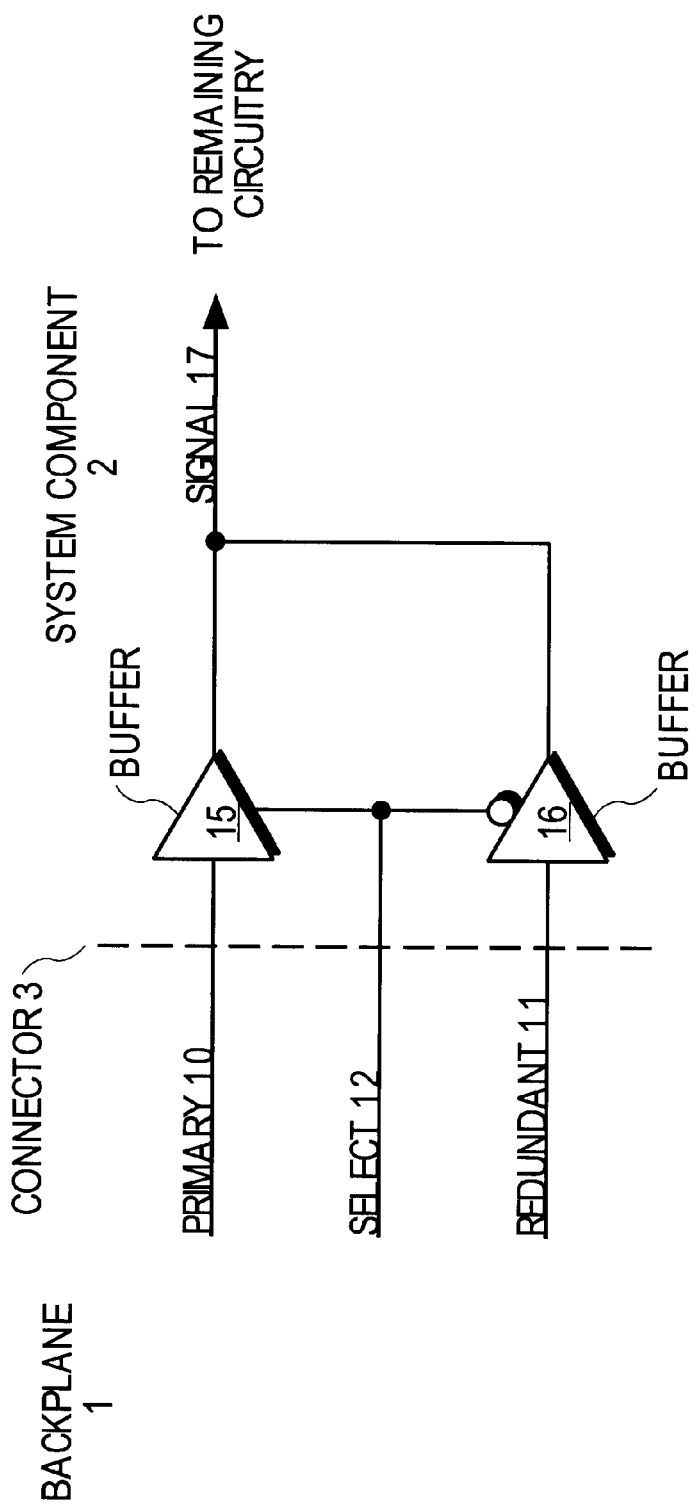
FIG. 1 shows a prior art mechanism for switching in redundant elements.

FIG. 1 shows a prior art example of how redundancy may be physically implemented in a data processing system. Specifically, a backplane 1 (e.g. a motherboard) is connected to a system component 2 (e.g. a bus card) via a physical connector 3. Backplane 1 includes a primary signal line 10, a redundant signal line 11, and a select signal line 12. System component 2 includes an input buffer 15 coupled to receive primary signal 10 and an input buffer 16 coupled to receive redundant signal line 11. The outputs of buffers 15 and 16 are commonly coupled to a signal line 17, which is routed to the remaining circuitry of system component 2. The select signal line 12 is used to convey a select signal that enables one or the other of buffers 15 and 16 to provide an input signal to signal line 17.

During normal operation, the select signal is logic high to enable buffer 15 and to disable buffer 16. Should primary signal line 10 fail, which may occur because the output buffer of a system component is incorrectly maintaining primary signal line 10 at a constant logic state or because of a physical defect in the primary signal line, a switching event occurs wherein the select signal transitions from the high logic state to the low logic state to enable buffer 16 and to disable buffer 15. Typically, there is a moment when buffer 15 and buffer 16 are both enabled to supply the input signal, which alters the loading of output signal line 17 and results in transients on signal line 17. A redundant output buffer (not shown) is switched in for the primary output buffer (also not shown) at the same time that input buffer 16 is switched in for input buffer 15, and transients that may be detected by other system components can occur on the primary and redundant signal lines.

Figure 2:
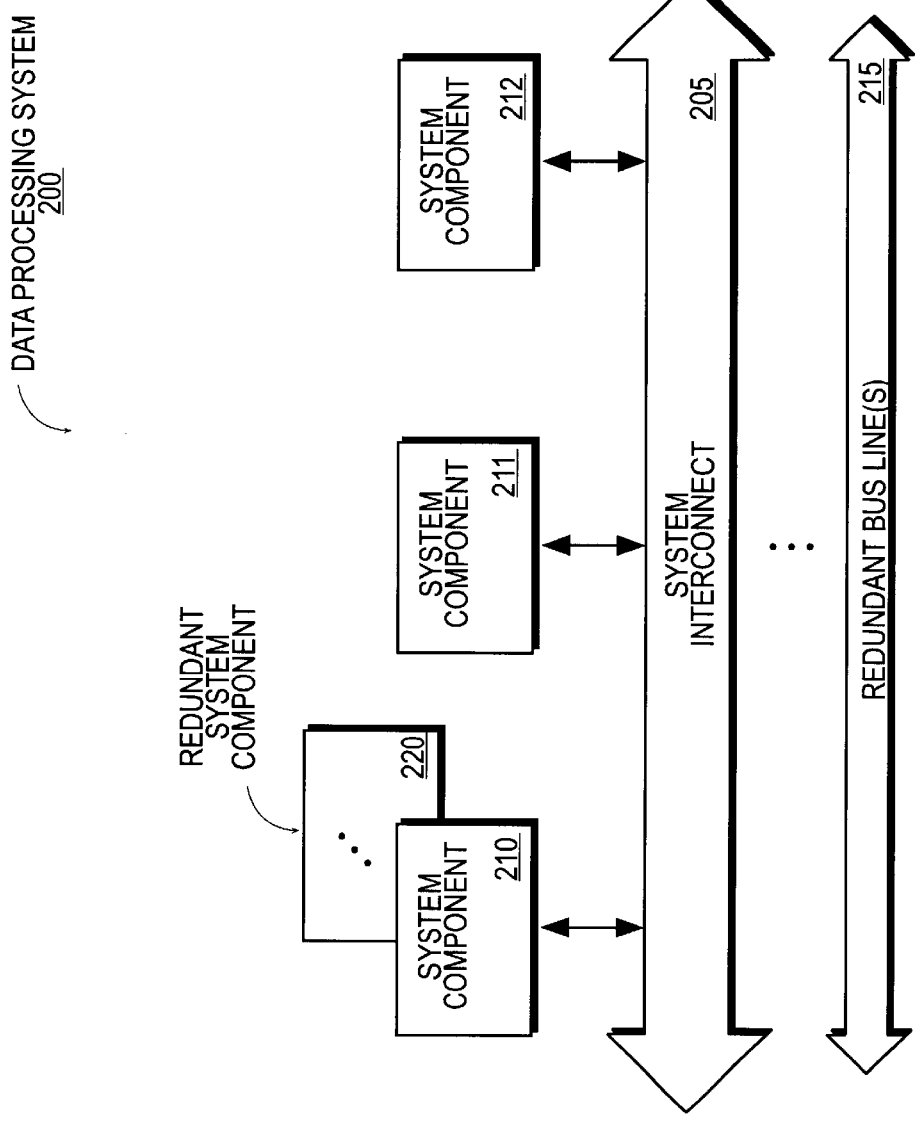
FIG. 2 shows a data processing system that operates according to a present embodiment.

FIG. 2 shows a data processing system of one embodiment. Data processing system 200 generally comprises a system interconnect 205 that includes the requisite address, control, and data buses for allowing the exchange of information among system components 210–212. Any system interconnect architecture may be used. Data processing system 200 further comprises a set of redundant elements that includes redundant bus line(s) 215 and redundant system component 220. Redundant bus line(s) 215 are provided should one or more bus lines of system interconnect 205 fail, and redundant system component 220 is provided to replace system component 210 should system component 210 fail.

According to the embodiment of FIG. 2, one or more of system components 210–212 includes hardware or executes software (not shown) that monitors the system interconnect and/or system components to determine whether an element of the data processing system may have failed. Any method for detecting element failure may be used. Should a system component determine that a switching event is necessary, that system component initiates the required switching event and informs the remaining system components that a switching event is about to occur. The system components then prepare themselves for the occurrence of the switching event by entering a standby mode of operation. Once the switching event has occurred, the system components return to the normal mode of operation.

Figure 3:
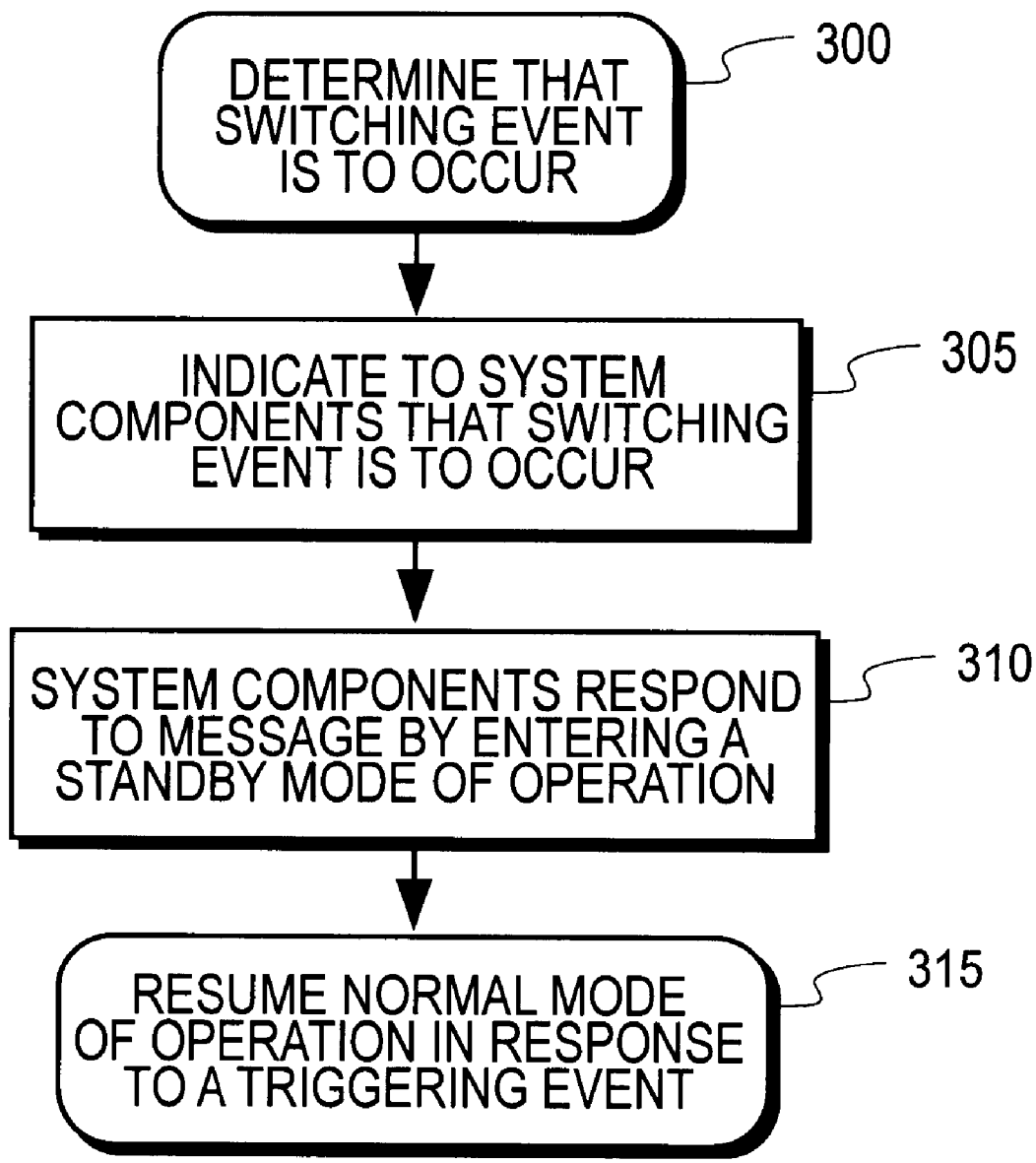
FIG. 3 is a flow diagram showing a method of operation for the data processing of FIG. 2.

FIG. 3 shows a general method of one embodiment. At process block 300, a system component determines that a switching event must be performed and initiates the switching event. At process block 305, the system component indicates to the other system components indicating that the switching event is to occur. At process block 310, the system components respond to the message by entering a standby mode of operation wherein the system components "isolate" themselves from at least that portion of system interconnect 205 that is to be affected by the switching event. "Isolation" of the system components from the system interconnect 205 may be achieved, for example, in the following ways: 1) by preventing the propagation of signals from the bus interface circuitry (e.g. buffers 15 and 16 of FIG. 1) of the system component to the remaining circuitry of the system component during the switching even; 2) by instructing the system component to "ignore" the signals at the bus interface circuitry during the switching event such that the system component does not change states during the switching event; and 3) forcing the output of the bus interface circuitry of the system component to a known state such as by tristating the outputs to present a high impedance. At process block 315, the system components resume the normal mode of operation in response to a triggering event.

There are a number of ways in which a first system component can indicate that a switching event is about to occur. For example, a system component may send a message via the data bus, or a system component may encode a message that is conveyed via the address bus or control bus of the system interconnect. Alternatively, a common control signal line may be routed to all system components for the express purpose of indicating when a switching event is to occur.

Similarly, there are a number of ways in which a triggering event may be specified to cause system components to resume normal operations. For example, a triggering event may be generated by the system component that initiated the switching event, or the triggering event may be generated internally by each system component. Triggering events may include, for example, 1) an indication that a predetermined period of time has elapsed, or 2) a message received from a portion of system interconnect 205 that was not isolated from the system components during the switching event. Alternative triggering events may be used.

Figure 4:
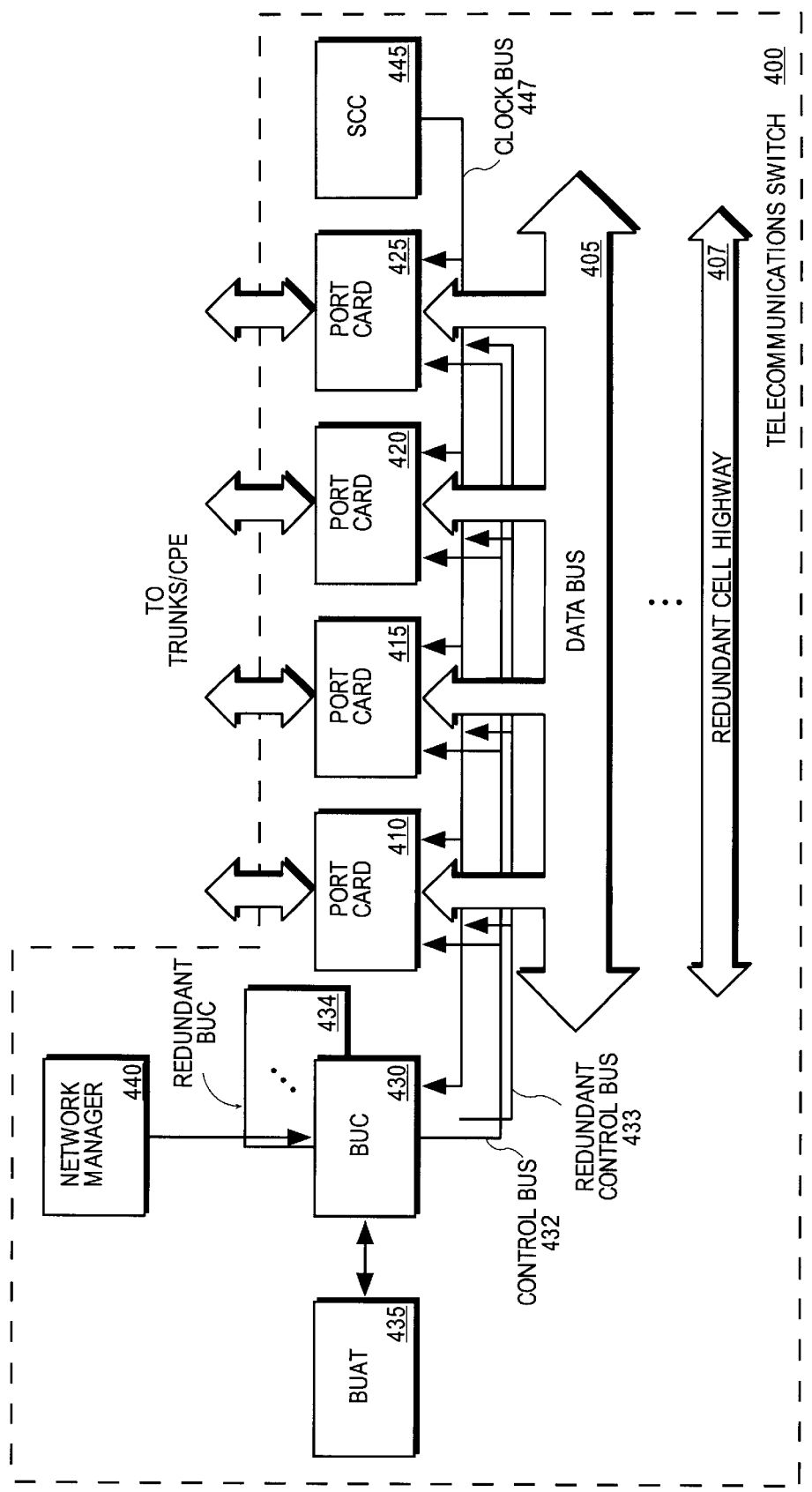
FIG. 4 shows a telecommunications switch that operates according to another embodiment.

FIG. 4 shows an embodiment wherein the data processing system is a telecommunications switch. Telecommunication switch 400 includes a plurality of port cards 410, 415, 420, and 425, each of which is coupled to either 1) a trunk line (or plurality of trunk lines) for interconnecting telecommunications switch 400 with other telecommunications switches (not shown), or 2) a network link (or plurality of network links) for interconnecting telecommunications switch 400 to customer premise equipment (CPE) (not shown). Telecommunications switch 400 also includes a system interconnect that allows the exchange of information between port cards such that CPEs coupled to telecommunications switch 400 and to remote telecommunications switches may exchange information.

According to the present embodiment, the system interconnect of telecommunications switch 400 comprises a data bus 405, a control bus 432, and a clock line 447. Port cards 410, 415, 420, and 425 use data bus 405 to exchange fast packets and/or asynchronous transfer mode (ATM) cells between one another. Port cards that are connected to CPEs that do not natively support fast packet or ATM protocols segment packets received from their network links into either fast packets or ATM cells. As discussed with respect to FIG. 5, data bus 405 includes a 64-bit data path that is subdivided into four independent 16-bit data paths or "cell highways." A redundant cell highway 407 is provided to replace one of the four cell highways of data bus 405 should it fail.

Data transfers using data bus 405 are controlled by bandwidth unit controller (BUC) 430, which issues control signals to the port cards using control bus 432. BUC 430 enforces an arbitration protocol wherein port cards are granted access to the data bus for discrete units of time called "bandwidth units." According to the present embodiment, each bandwidth unit is equal to twenty-eight (28) clock cycles of the system clock signal BUSCLK, which is supplied by a system clock controller 445 via clock line 447. As each cell highway can provide two bytes of data per clock cycle, each cell highway can transfer one 53 byte ATM cell or two 28 byte fast packets per bandwidth unit.

BUC 430 allocates bandwidth units to the port cards in response to information contained by bandwidth unit allocation table (BUAT) 435. Before the end of a current bandwidth unit, BUC 430 reads the next table entry of BUAT 435 to determine which port card is to be granted access to data bus 405 for the next bandwidth unit. The table entries of BUAT 435 are dynamically assigned to port cards by network manager 440 in view of the information rates of the port cards.

In addition to redundant cell highway 407, telecommunications switch 400 includes redundant BUC 434 and redundant control bus 433 as redundant elements. According to the present embodiment, only one switching event can occur at a time. Thus, a first switching event wherein redundant cell highway 407 is switched in for a cell highway of data bus 405 must be completed before beginning a second switching event wherein redundant BUC 434 is switched in for BUC 430. All switching events occur during so-called "dead bandwidth units" (DBUs).

When network manager 440 determines that a switching event must occur, network manager 440 creates a DBU in BUAT 435. When a table entry that specifies a DBU is encountered BUC 430, it signals that the next bandwidth unit is a DBU, which causes the port cards to enter a standby mode of operation wherein the port cards isolate themselves from data bus 405 for the entirety of the DBU. Port cards resume normal operation in response to detecting the occurrence of a normal bandwidth unit as signaled by BUC 430 via control bus 432.

Figure 5:
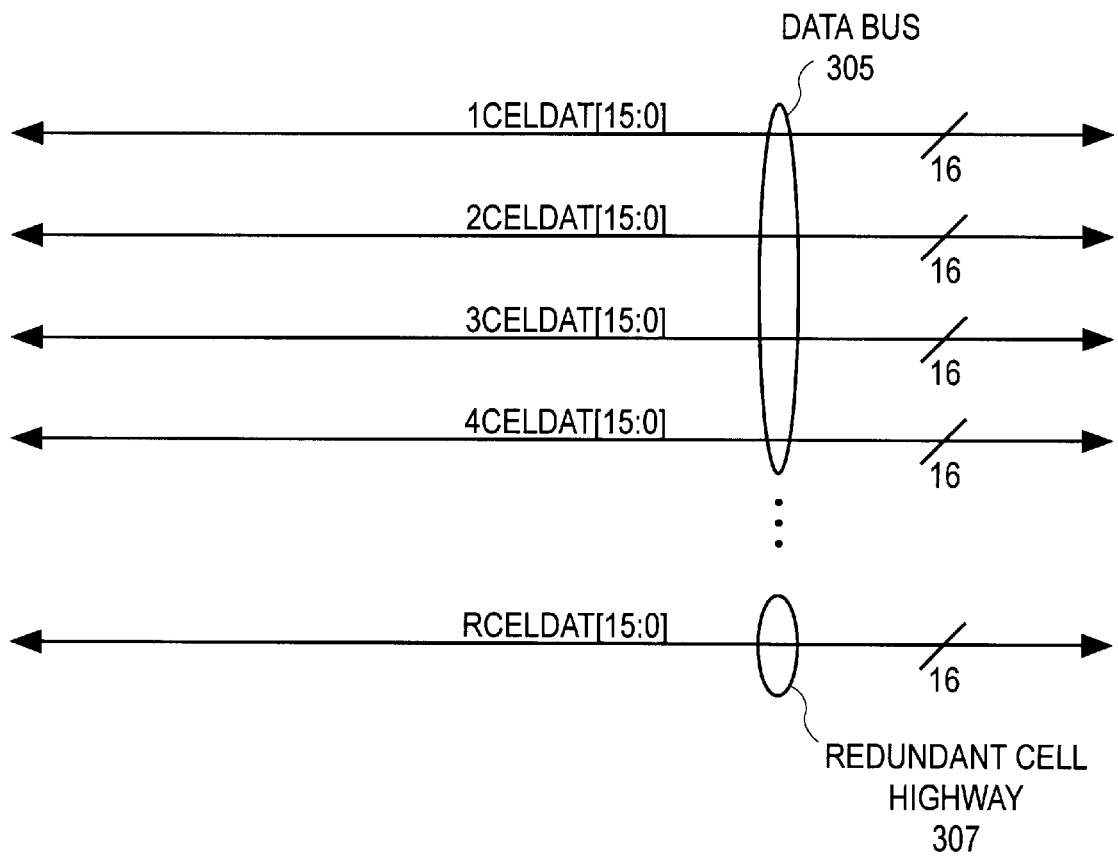
FIG. 5 shows the data bus of a telecommunications switch in more detail.

FIG. 5 shows the signal lines of data bus 405 in more detail. As previously described, data bus 405 comprises four 16-bit cell highways nCELDAT[15:0], (n=1, 2, 3, or 4). During a bandwidth unit, a single port card is enabled to use one or more of the four cell highways. When using multiple cell highways, the commencement of data transmission is delayed by one clock cycle for each cell highway. For example, data transmission on 2CELDAT[15:0] begins one clock cycle after data transmission begins on 1CELDAT [15:0], one clock cycle before data transmission begins on 3CELDAT[15:0], and two clock cycles before data transmission begins on 4CELDAT[15:0]. Skewing the beginning of data transmission as between cell highways allows slower speed logic to be implemented by a receiving port card when determining whether the fast packets or ATM cells are destined for that port card.

Figure 6:
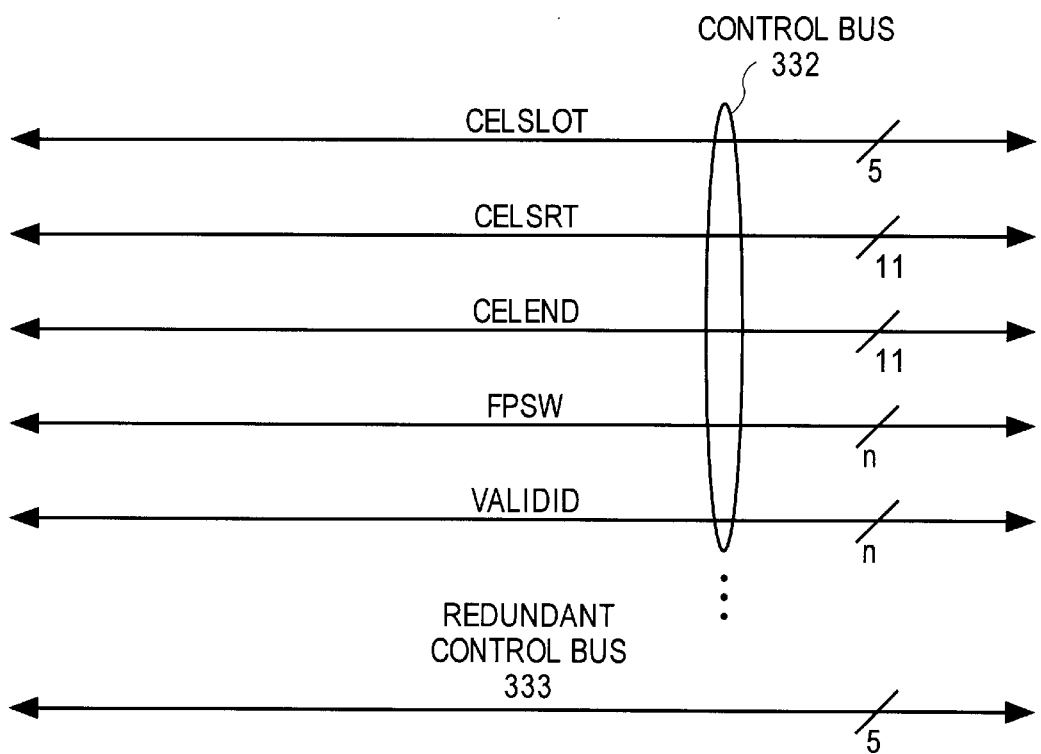
FIG. 6 shows the control bus of a telecommunications switch in more detail.

FIG. 6 shows the signal lines of control bus 332. Control bus 332 generally comprises the following signals:

| | |
|---|---|
| CELSLOT[4:0] | The "CELL SLOT" signal is a 5-bit slot address value asserted by BUC 430 to indicate which port card will control data bus 405 during the next bandwidth unit. |
| CELSRT | The "CELL START" signal is asserted by BUC 430 four clock cycles prior to the beginning of the next bandwidth unit for a duration of four clock cycles. |
| CELEND | The "CELL END" signal is asserted by BUC 430 eight clock cycles prior to the end of the current bandwidth unit for a duration of four clock cycles. |
| FPSWn (n = 1, 2, 3, 4) | A "FAST PACKET SWITCH" signal is driven by the transmitting port card for each cell highway to indicate whether cell highway is transferring fast packets or ATM cells. |
| VALIDHDn (n = 1, 2, 3, 4) | A "VALID HEADER" signal is asserted by the transmitting port card for each cell highway to indicate when valid fast packets or cells are being driven on a cell highway. |

All of the signals of control bus 332 are clocked in response to the rising edge of the BUSCLK signal.

According to the present embodiment, the CELSRT and CELEND signals are used to indicate DBUs. Specifically, BUC 430 indicates a DBU by simultaneously asserting both CELSRT and CELEND during the last four clock cycles of the current bandwidth unit. Port cards enter the standby mode of operation in response to CELSRT and CELEND being asserted and do not resume normal operation until detecting assertion of CELSRT alone.

Figure 7:
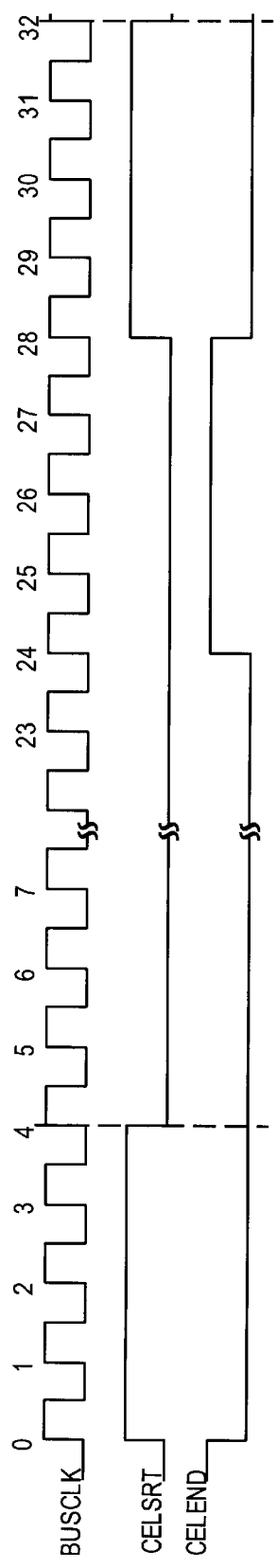
FIG. 7 is a timing diagram showing the control signals for a normal bandwidth unit.

FIG. 7 shows a timing diagram for signaling the beginning and end of a normal bandwidth unit. BUC 430 begins to assert the CELSRT signal for four clock cycles at clock cycle zero. BUC 430 deasserts the CELSRT signal at clock cycle 4 to indicate the beginning of a bandwidth unit during which data is to be transferred between port cards. At clock cycle 24, which is eight clock cycles prior to the end of the bandwidth unit, BUC 430 begins to assert the CELEND signal for four clock cycles until clock cycle 28, whereupon the CELEND signal is deasserted and the CELSRT signal is asserted. The next bandwidth unit begins at clock cycle 32. For bandwidth units that are not allocated to system components, the CELSRT signal remains deasserted from clock cycles 28–32.

Figure 8:
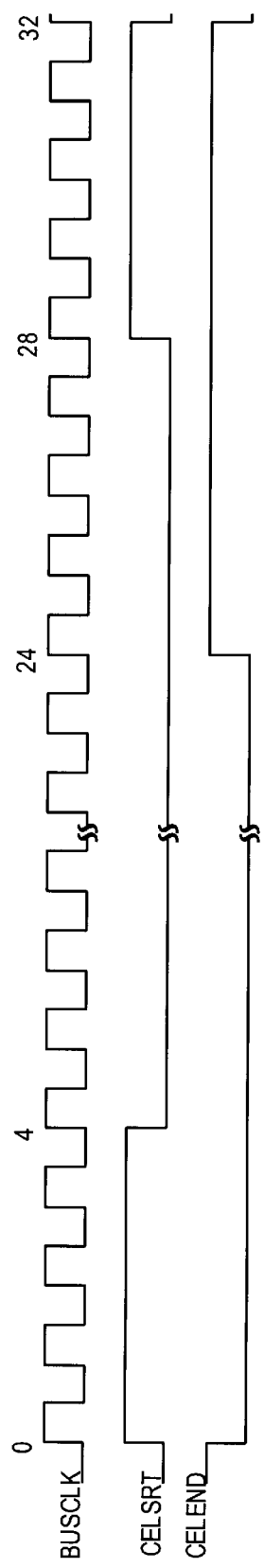
FIG. 8 is a timing diagram showing the control signals for a dead bandwidth unit.

FIG. 8 shows a timing diagram for signaling the beginning of a dead bandwidth unit. Clock cycles 0–27 of FIG. 8 are identical to the same clock cycles of FIG. 9. At clock cycle 28, however, BUC 430 continues to assert the CELEND signal such that both CELSRT and CELEND are asserted for the last four clock cycles of the present bandwidth unit.

For switching events that involve data bus 405 and redundant cell highway 407, it is sufficient for the port cards to isolate themselves from data bus 405. For switching events that involve redundant elements such as redundant control bus 433 and redundant BUC 434, transients may occur at the control bus interfaces of the port cards, and isolation from data bus 405 is insufficient. Furthermore, as it is BUC 430 and control bus 433 that are used to communicate the beginning and end of switching events, isolation of the port cards from the control bus is undesirable.

According to the present embodiment, BUCs and port cards are prevented from incorrectly changing logical states by holding the BUSCLK signal high during control bus and BUC switching events. As stated previously, port cards sample the values of the control bus in response to the rising edge of the BUSCLK signal. Because the BUSCLK signal is provided separately from the control bus and because the BUSCLK signal is maintained in a high logic state, the port cards are prevented from sampling the values conveyed by the control bus.

Figure 9:
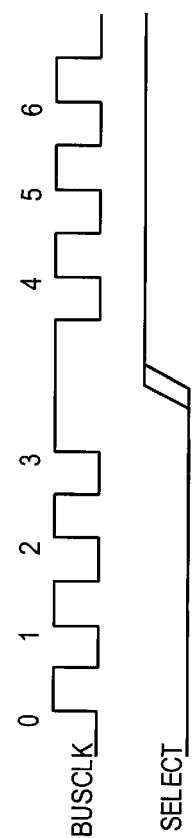
FIG. 9 is a timing diagram showing control of a system clock signal during switching events that affect the control bus.

FIG. 9 is a timing diagram showing the behavior of the BUSCLK signal during BUC and control bus switching events. In order to ensure that invalid control signals are not sampled by the port cards, SCC 445 holds the BUSCLK signal high during a switching event such that the bus clock cannot transition from a low to a high value during the switching event, which is indicated by the "SELECT" signal transitioning from low to high.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. In a data processing system that includes a number of system components and one or more redundant system components, a method for protecting the system components from transients that arise on a system interconnect during switching events, comprising:

the system components operating in a normal mode of operation;

detecting that a switching event, wherein a first redundant system component replaces a failed system component, is to occur;

indicating to the system components that the switching event is to occur;

the system components entering a standby mode of operation wherein each of the system components isolate their circuitry from the system interconnect during the switching event by tri-stating respective interfaces to the system interconnect; and the system components returning to the normal mode of operation in response to a triggering event.

2. The method of claim 1 wherein the step of detecting that a switching event is to occur comprises:
   a first system component detecting that a second system component of the data processing system has failed; and
   the first system component requesting that the switching event occur in order to replace the second system component with a first of the redundant system components.

3. The method of claim 1 wherein the step of indicating to the system components that the switching event is to occur comprises:
   a first system component issuing a message to remaining system components, the message indicating that the switching event is to occur.

4. The method of claim 1, wherein the step of the system components returning to the normal mode of operation in response to a triggering event comprises:
   a first system component indicating that the normal mode of operation is to resume.

5. The method of claim 1, wherein the system interconnect includes a time division multiplexed data bus for which access is granted in groups of timeslots called bandwidth units, the step of indicating to the system components that the switching event is to occur comprises:
   an allocating system component issuing a dead bandwidth unit that specifically indicates that no system components are to be granted access during the dead bandwidth unit and that all system components should prepare for a switching event.

6. The method of claim 5, wherein the step of the system components returning to the normal mode of operation in response to a triggering event comprises:
   the allocating system component issuing a normal bandwidth unit wherein one of the system components is granted access to the system interconnect.

7. In a data processing system that includes one or more redundant system components, a method for enabling system components of the data processing system to ignore transients that occur on a system interconnect of the data processing system during switching events, comprising:
   indicating to the system components of the data processing system that the switching event is about to occur; and
   the system components each isolating themselves from the system interconnect by tri-stating respective interfaces to the system interconnect until a triggering event occurs.

8. The method of claim 7 wherein the step of indicating to the system components that the switching event is to occur comprises:
   a first system component issuing a message to remaining system components, the message indicating that the switching event is to occur.

9. The method of claim 8 further comprising the step of the first system component causing the triggering event to occur.

10. The method of claim 7, wherein the system interconnect includes a time division multiplexed data bus for which access is granted in groups of timeslots called bandwidth units, the step of indicating to the system components that the switching event is to occur comprises:
    an allocating system component issuing a dead bandwidth unit that specifically indicates that no system components are to be granted access during the dead bandwidth unit and that all system components should prepare for a switching event.

11. The method of claim 10, wherein the step of the system components returning to the normal mode of operation in response to a triggering event comprises:
    the allocating system component issuing a normal bandwidth unit wherein one of the system components is granted access to the system interconnect.

12. A data processing system comprising:
    a system interconnect;
    a redundant system component coupled to the system interconnect; and
    a plurality of system components coupled to the system interconnect wherein a first system component informs other system components that the redundant system component is to be switched into the data processing system whereupon each of the plurality of system components isolate themselves from the system interconnect until a triggering event occurs,
    wherein at least one of the system components is configured to isolate itself from the system interconnect by tri-stating an interface to the system interconnect.

13. A data processing system as in claim 12 wherein at least one of the system components is configured to isolate itself from the system interconnect by preventing the propagation of signals from the signal interconnect.

14. A data processing system as in claim 12 wherein at least one of the system components is configured to isolate itself from the system interconnect by ignoring signals from the system interconnect.

* * * * *